(12) United States Patent
Frankel et al.

(10) Patent No.: US 7,343,101 B1
(45) Date of Patent: Mar. 11, 2008

(54) METHOD AND SYSTEM FOR REDUCING CROSSTALK IN AN OPTICAL COMMUNICATION NETWORK

(75) Inventors: Michael Y. Frankel, Baltimore, MD (US); Mahir Nayfeh, Catonsville, MD (US)

(73) Assignee: Ciena Corporation, Linthicum, MD (US)

( * ) Notice: Subject to any disclaimer, the term of this patent is extended or adjusted under 35 U.S.C. 154(b) by 585 days.

(21) Appl. No.: 10/256,561

(22) Filed: Sep. 27, 2002

(51) Int. Cl.
  *H04B 10/00* (2006.01)
(52) U.S. Cl. ...................... 398/158; 398/161
(58) Field of Classification Search ............... 398/79, 398/102, 158–161
  See application file for complete search history.

(56) References Cited

U.S. PATENT DOCUMENTS

| | | | | |
|---|---|---|---|---|
| 6,377,377 | B1 * | 4/2002 | Gehlot | 398/140 |
| 6,381,048 | B1 * | 4/2002 | Chraplyvy et al. | 398/79 |
| 6,570,684 | B1 * | 5/2003 | Stone et al. | 398/45 |
| 6,587,470 | B1 * | 7/2003 | Elliot et al. | 370/404 |
| 6,618,395 | B1 * | 9/2003 | Kimmitt | 370/473 |
| 2001/0037160 | A1 * | 11/2001 | Kumata | 700/94 |
| 2002/0018492 | A1 * | 2/2002 | Sakai et al. | 370/512 |
| 2002/0071155 | A1 * | 6/2002 | Inada et al. | 359/124 |
| 2004/0047283 | A1 * | 3/2004 | Bonwick et al. | 370/201 |
| 2004/0243871 | A1 * | 12/2004 | Nieuwland et al. | 713/401 |

OTHER PUBLICATIONS

A. J. Lucero, et al., "Impact of bit pattern and dispersion variation on cross-phase modulation penalty," Optical Fiber Communications Conference Technical Digest, vol. 3, pp. 37-38, 1999.
L.E. Nelson, et al., "Resonances in Cross-Phase Modulation Impairment in Wavelength-Division-Multiplexed Lightwave Transmission," IEEE Photonics Technology Letters, vol. 11, pp. 907-909, 1999.
S. G. Evangelides, Jr., "Cross phase modulation resonances in WDM systems," Optical Fiber Communications Conference Technical Digest, vol. 3, pp. 240-242, 1999.
Giovanni Bellotti, et al., "10×10 Gb/s Cross-Phase Modulation Suppressor for Multispan Transmissions Using WDM Narrow-Band Fiber Bragg Gratings," IEEE Photonics Technology Letters, vol. 12, pp. 1403-1405, 2000.

* cited by examiner

*Primary Examiner*—Agustin Bello
(74) *Attorney, Agent, or Firm*—Clements Walker; Christopher L. Bernard; Tyler S. Brown

(57) ABSTRACT

A method of reducing correlation between channels in an optical communication network. A transmission characteristic of first data on a first channel is altered to reduce correlation between the first data and second data on a second channel. The reduction in correlation reduces crosstalk. The transmission characteristic may be one or more of time delay, scrambling, inversion or modulation.

11 Claims, 11 Drawing Sheets

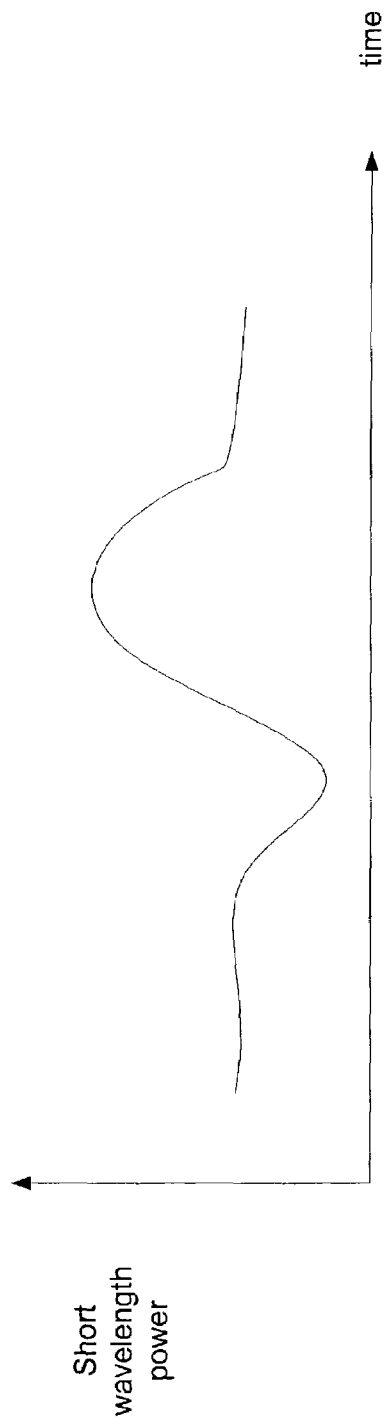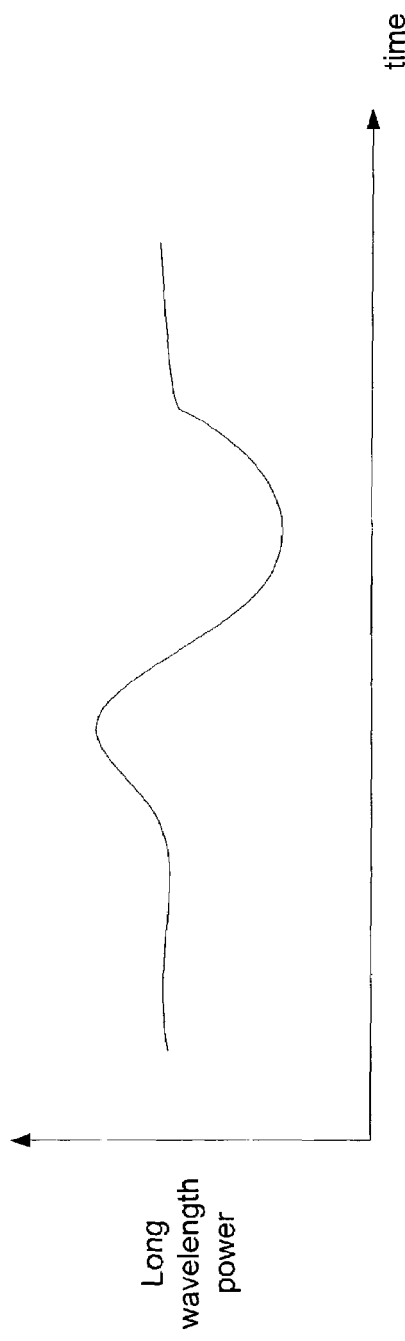

METHOD AND SYSTEM FOR REDUCING CROSSTALK IN AN OPTICAL COMMUNICATION NETWORK

BACKGROUND OF THE INVENTION

1. Field of Invention

This invention relates to a method and system for reducing crosstalk in an optical communication network.

2. Description of Related Art

Fiber-optic communication networks are experiencing rapidly increasing deployment. Especially rapid is the growth of segments that carry multi-gigabit digital data on multiple wavelengths over a single fiber strand using wavelength division multiplexing (WDM). Increases in wavelength channel density (i.e., reduced channel spacing) and increases in the data rate carried on individual wavelengths lead to an increase in nonlinear crosstalk between channels. For passive optical fibers, the crosstalk mechanisms are cross-phase modulation, four-wave mixing, and Raman crosstalk. Further, active components, such as fiber-based or semiconductor based optical amplifiers will add cross-gain modulation.

The nonlinear crosstalk effects are additive to the overall interference level. The addition occurs in terms of each additional wavelength channel contributing a crosstalk component to the overall interference level. The additive effect also occurs in systems that have multiple optical links with intermediate optical amplification, such that each link also contributes an additional crosstalk component to the overall noise level. It is well known that the details of the bit pattern on each channel are important for the accurate estimation of the noise levels.

Due to the additive property of the crosstalk, whenever there is signal correlation among the wavelength channels, the crosstalk level will be maximized. In general, the data transported on each wavelength is expected to be random and not correlated. However, there are situations where data correlation exists. One situation involves transmission formats in which specific framing structures that define a specific protocol are used for data transport (e.g., SONET, SDH, Ethernet, ESCON, FiberChannel). A second situation involves default null data that is transmitted when external data is not present on a specific channel.

For example, FIG. 1 depicts two channels λ1 and λ2 carrying OC-192 SONET-framed data. SONET delineates its frames via two framing bytes, A1 (11110110) and A2 (00101000). The length of the framing is directly related to the signal rate. In the case of OC-192 data, the framing contains a 192-byte sequence of A1 bytes, followed by a 192-byte sequence of A2 bytes. Following the initial framing bytes is the payload (information to be transmitted) and additional framing bytes. Similarly, for OC-48 data, the framing contains a 48-byte sequence of A1 bytes followed by a 48-byte sequence of A2 bytes. As shown in FIG. 1, if the data on wavelengths λ1 and λ2 are launched simultaneously, the data patterns on each channel are highly correlated due to the presence of the SONET framing.

It is apparent that the A1 bytes present a pattern overweighted with '1's, and A2 bytes are overweighted with '0's. Due to channel synchronization, Raman crosstalk in the fiber depletes power from the short-wavelength channels during A1 bytes, and transfers this power to the A1 bytes of long wavelength channels. FIG. 2A illustrates the envelope of the power transferred from short wavelengths to long wavelengths during the A1 bytes of the SONET frame. Conversely, Raman-mediated power transfer is substantially eliminated during the A2 bytes where there is an average power increase in short-wavelength channels and a corresponding power dip in the long-wavelength channels (FIG. 2B). This transfer of power is due to high correlation and represents unwanted crosstalk between channels.

BRIEF DESCRIPTION OF THE DRAWINGS

Embodiments of the invention will become more fully understood from the detailed description given hereinbelow and the accompanying drawings which are given by way of illustration only, and thus are not limitative of the present invention, and wherein:

FIGS. 2A and 2B are plots of power envelopes versus time for short and long wavelength channels experiencing crosstalk;

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communication networks, including electrical and optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connection" and "operative connection" as used herein are relative terms and do not require a direct physical connection.

Figure 1:
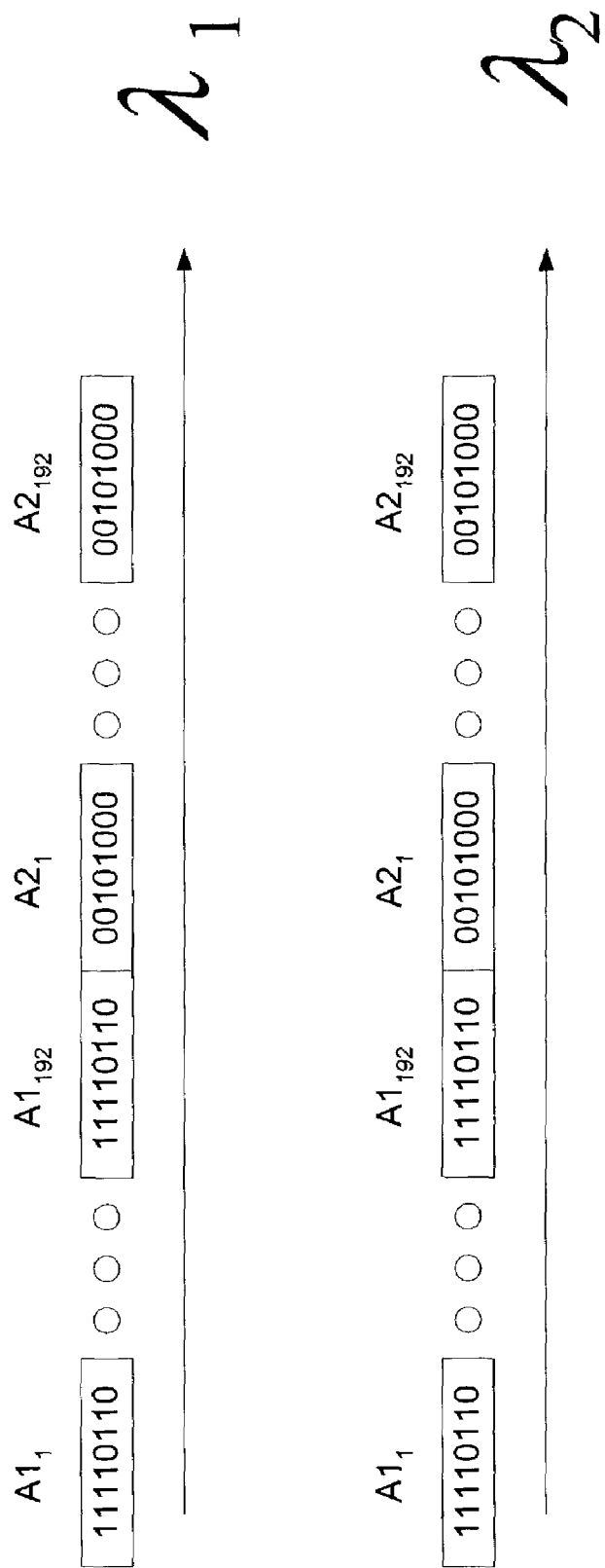
FIG. 1 illustrates correlated data due to the presence of SONET framing bytes.
Figure 3:
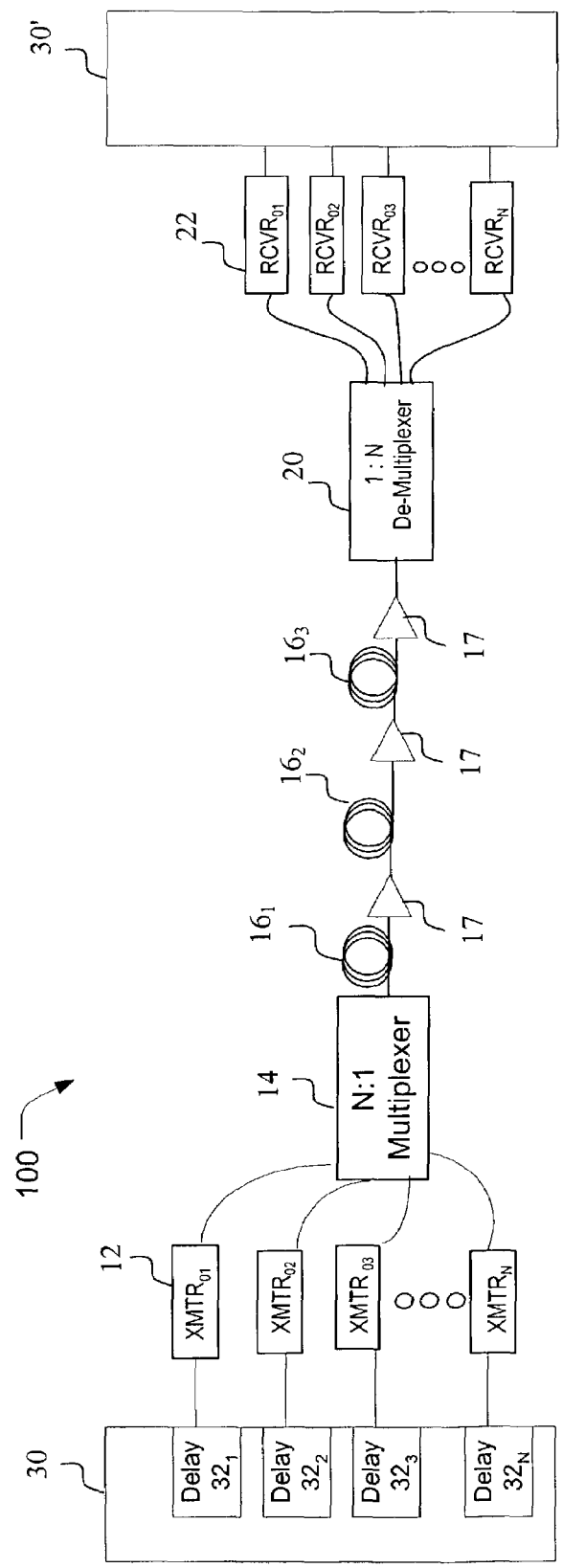
FIG. 3 is a block diagram of a portion of an optical communication network in an embodiment of the invention.

FIG. 3 depicts a portion of an optical communication network 100 in an exemplary embodiment of the invention. The optical communication network 100 includes a network element 30 that directs network traffic. The network element 30 may be a switch, such as the COREDIRECTOR™ switch from CIENA corporation, a router or other network element that directs network traffic. In the embodiment shown in FIG. 3, the network element 30 includes a number of programmable, electrical delays 32.

Although a delay 32 is shown for each channel, it is understood that fewer delays may be used and each channel does not require a delay. As described in further detail herein, the delays 32 are used to stagger, with respect to time, data on different channels so that the data patterns are de-correlated to reduce crosstalk.

Each delay is coupled to at least one transmitter 12, each generating data on a distinct optical wavelength for transmission over the network. The transmitters ($XMTR_{01}$-$XMTR_N$) 12 optically communicate with an optical multiplexer 14 that combines the individual data signals into a WDM signal. The WDM signal is optically communicated to transmission fiber links 16. In the preferred embodiment, the transmission fiber links 16 are non-zero dispersion shifted fiber (NZDSF) but may be implemented using other types of fiber such as dispersion shifted fiber (DSF), or non-dispersion shifted fiber (NDSF). The optical communication network may employ different architectures such as ring or mesh, rather than the linear architecture in FIG. 3.

Optical communication network 100 may also include amplifiers 17 that are used to regenerate the WDM signal. Amplifiers 17 typically are also used to overcome the loss associated with the transmission fiber links 16 or other network elements (e.g., dispersion compensating fiber). A de-multiplexer 20 in optical communication with the transmission fiber links 16 de-multiplexes the WDM signal and directs each optical carrier to an appropriate receiver ($RCVR_{01}$-$RCVR_N$) 22 designated for a particular wavelength. The receivers 22 may provide the received signals to another network element 30' such as a switch or router. It should also be noted that transmitters 12 and receivers 22 may be incorporated into network elements 30 and 30' respectively.

The delays 32 in network element 30 may be controlled in a variety of manners to provide signal decorrelation. In one embodiment, the delays 32 are programmed to have fixed time delays, such that adjacent channels have different time delays. For example, the header for an OC-192 SONET data stream contains 192 A1 bytes and 192 A2 bytes, which requires 308 ns to transmit. Thus, each consecutive channel may be delayed by some predetermined amount (e.g., 308 ns) relative to the preceding channel to insure the channels are decorrelated. The time delay introduced by delays 32 shifts data patterns relative to data patterns in other channels. This reduces correlation between such channels and reduces crosstalk.

Figure 3A:
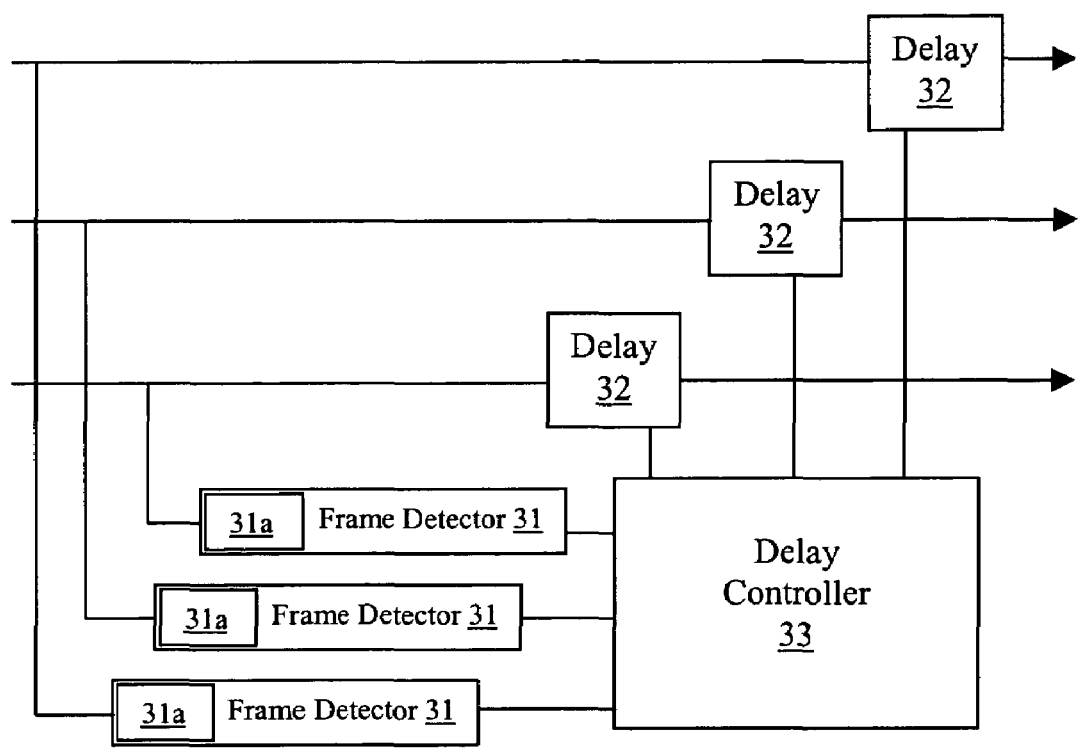
FIG. 3A is a block diagram of components for adjusting delay in an embodiment of the invention.

FIG. 3A illustrates components that may be included in network element 30 to provide for active control of delays 32. The incoming channels are provided to frame detectors 31 that detect the presence of framing bytes (e.g., A1 and A2 bytes in SONET header). The frame detector may detect a synchronization signal that is typically available from the digital circuitry that forms the framing information under the communication protocol. If such a synchronization signal is not available, the frame detector may determine the presence of framing bytes by processing the incoming data signals. For example, low-pass filtering 31a of SONET-framed signals produces a bipolar pulse at the A1/A2 byte locations.

Each frame detector 31 outputs a detection signal indicating the presence of framing bytes to a delay controller 33. The delay controller 33 may be implemented using known devices such as a microprocessor, field programmable logic array (FPGA) or application specific integrated circuit (ASIC). The delay controller 33 controls delays 32 based on the presence and the relative timing between the framing bytes detected on each channel. For example, if the framing bytes on each channel are already sufficiently spaced in time, then no delay needs to be provided by delays 32. Alternatively, if the framing bytes are aligned in time, and thus correlated, the delay controller controls the amount of delays introduced by each delay 32 to reduce correlation between channels.

Figure 4:
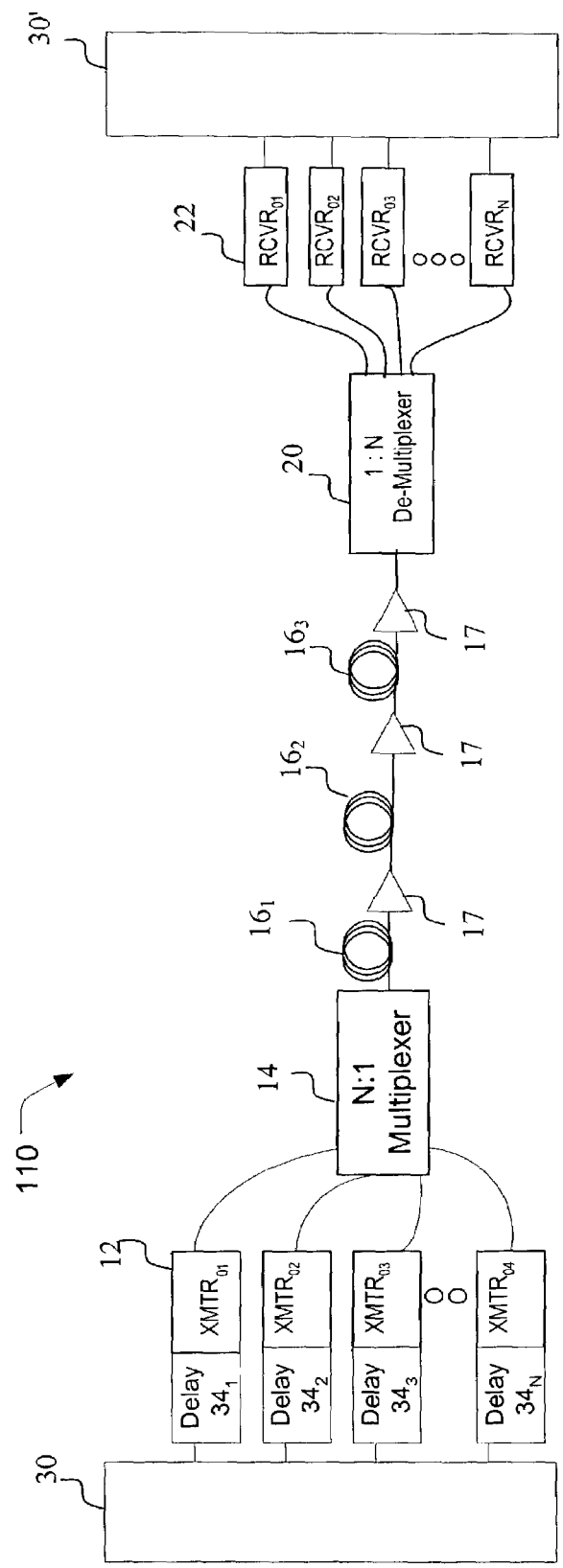
FIG. 4 is a block diagram of a portion of an optical communication network in an alternate embodiment of the invention.

FIG. 4 depicts a portion of an optical communication network 110 in an alternate embodiment of the invention. In FIG. 4, delays 34 are incorporated in the transmitters 12. As in the embodiment of FIG. 3, the delays 34 are programmable, electrical devices. As described above, the delays 34 may be programmed to have fixed time delays, such that adjacent channels have different time delays. Alternatively, the delays 34 may be actively controlled as described with reference to FIG. 3A.

Although a delay 34 is depicted for each channel, it is understood that not every channel requires a delay 34. The time delay introduced by delays 34 shifts data patterns relative to data patterns in channels that contribute to crosstalk. This reduces correlation between such channels and thus reduces crosstalk.

Figure 5:
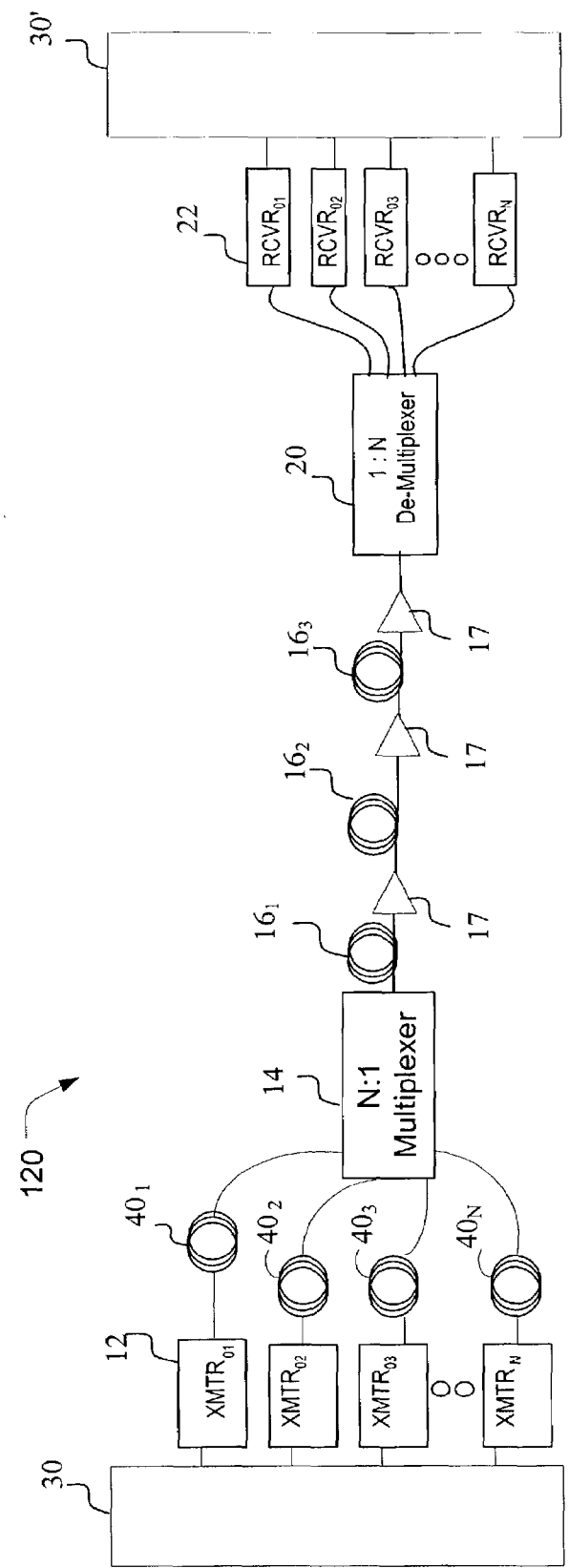
FIG. 5 is a block diagram of a portion of an optical communication network in an alternate embodiment of the invention.

FIG. 5 depicts a portion of an optical communication network 120 in an alternate embodiment of the invention. In FIG. 5, channel delay is achieved using optical delay lines 40. Optical delays lines of different length may be used to create different time delays for each channel prior to multiplexer 14. The optical delay lines 40 may be used in the same manner as the electrical delay devices 32 and 34 descried above. Although an optical delay line 40 is depicted with each channel, it is understood that not every channel requires an optical delay line 40.

Each consecutive channel may be delayed by some predetermined amount relative to preceding channel. The time delay introduced by optical delay lines 40 shifts data patterns relative to data patterns in consecutive channels. This reduces correlation between adjacent channels and thus reduces crosstalk.

Figure 6:
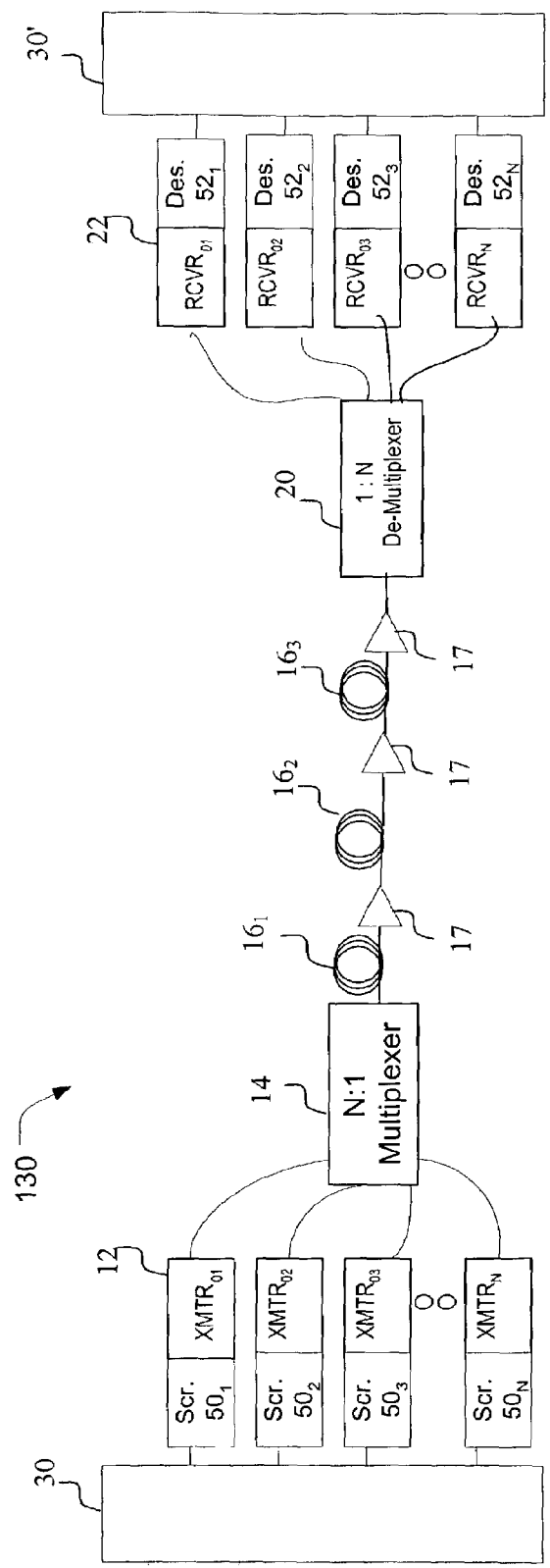
FIG. 6 is a block diagram of a portion of an optical communication network in an alternate embodiment of the invention.

FIG. 6 depicts a portion of an optical communication network 130 in an alternate embodiment of the invention. The embodiment of FIG. 6 utilizes scrambling devices 50 in one or more transmitters to introduce randomness to the data signals on each channel. Corresponding descrambling devices 52 are provided in one or more receivers. The scrambling devices 50 and descrambling devices 52 may be implemented using existing devices. The scrambling devices 50 scramble frame-related patterns (e.g., SONET headers). The scrambling devices 50 also introduce additional high-order polynomial scrambling to data on the channel, with varying polynomial orders. The scrambling breaks up the periodic nature of the frame-related patterns to reduce correlation between channels.

Although a scrambling device 50 is depicted with each channel, it is understood that not every channel requires a scrambling device 50. In one embodiment, each consecutive channel may be scrambled to reduce correlation. The scrambling device 50 rearranges data patterns relative to data patterns in channels that contribute to crosstalk. This reduces correlation between such channels and thus reduces crosstalk.

Figure 7:
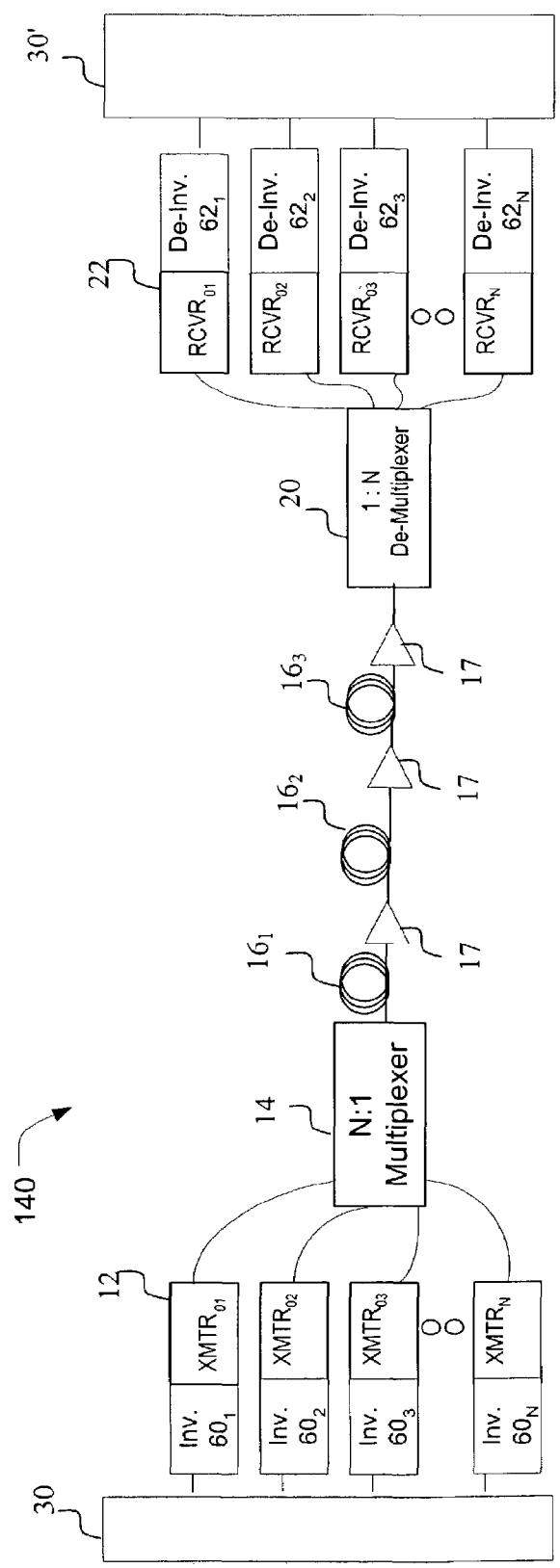
FIG. 7 is a block diagram of a portion of an optical communication network in an alternate embodiment of the invention.

FIG. 7 depicts a portion of an optical communication network 140 in an alternate embodiment of the invention. The embodiment of FIG. 7 utilizes inversion devices 60 in one or more transmitters 12. The inversion device 60 may be implemented using an electronic circuit that has the ability to select data or inverse data as the output. A corresponding data de-inversion device 62 is provided at each receiver 22. The de-inversion device 62 may be implemented using an electronic circuit that has the ability to select data or inverse data as an output.

Figure 8:
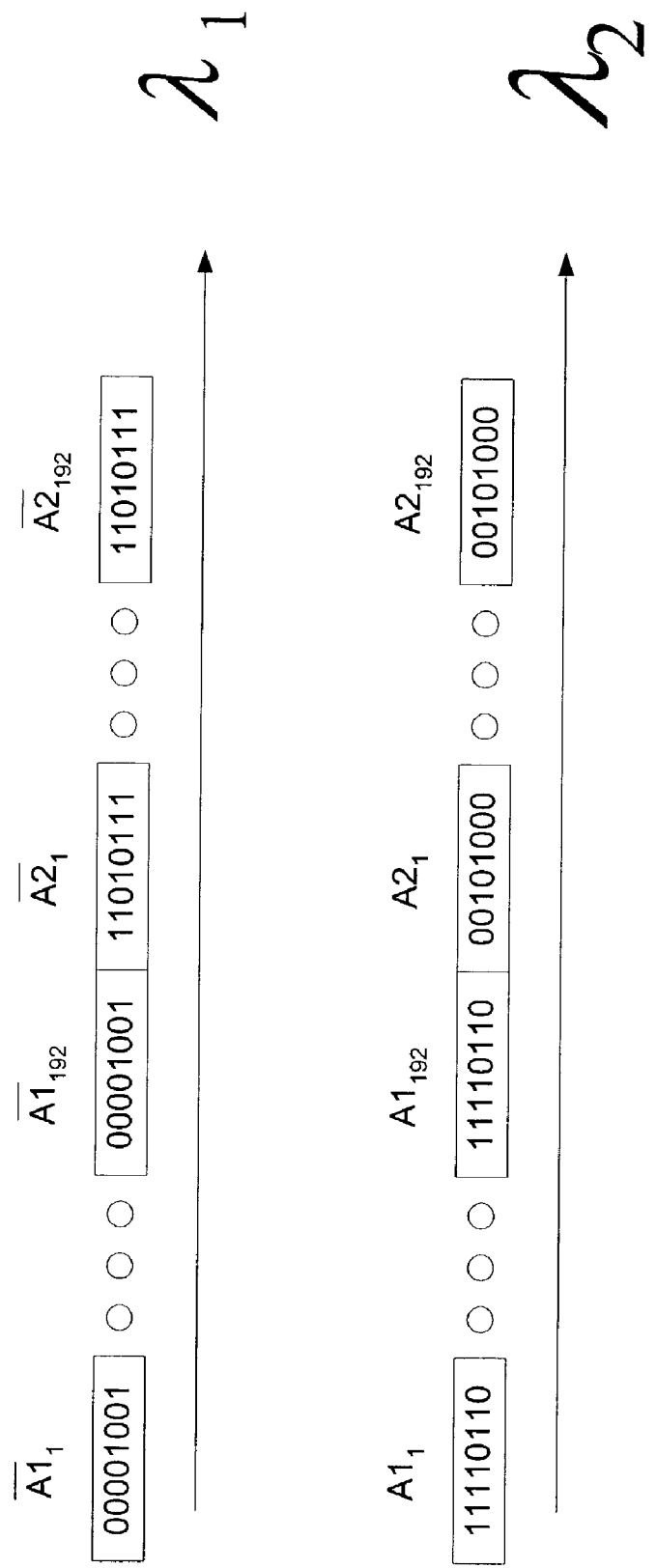
FIG. 8 illustrates de-correlation achieved by inverting data on one channel.

The effect of the inversion is illustrated in FIG. 8, which depicts two channels, designated as λ1 and λ2 carrying OC-192 SONET-framed data. The SONET header bytes A1 and A2, along with all bytes in the SONET payload, in channel λ1 have been inverted such that its A1 and A2 bytes are opposite of the A1 and A2 bytes in channel λ2.

Although an inversion device 60 is depicted with each channel, it is understood that not every channel requires an inversion device 60. For example, every other consecutive channel may include an inversion device 60 to establish anti-correlation of data between channels.

Figure 9:
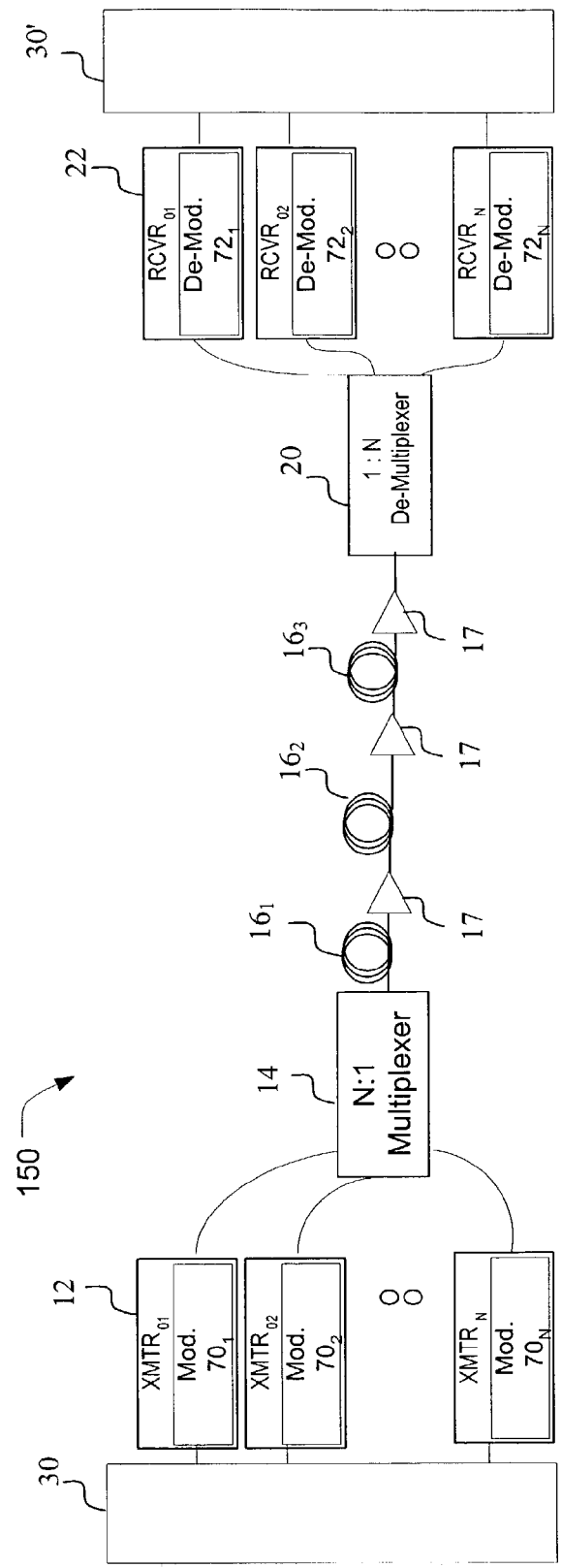
FIG. 9 is a block diagram of a portion of an optical communication network in an alternate embodiment of the invention.

FIG. 9 depicts a portion of an optical communication network 150 in an alternate embodiment of the invention. The embodiment of FIG. 9 utilizes modulation devices 70 in one or more transmitters 12. The modulation device 70 provides a constant-envelope modulation (such as frequency modulation) to remove cross-talk mechanisms that are induced by power amplitude variation. Examples of cross-talk mechanisms that depend on power amplitude variation are self-phase modulation, cross-phase modulation, and Raman cross-gain modulation. Corresponding demodulation devices 72 are provide in the receivers 22.

Figure 10:
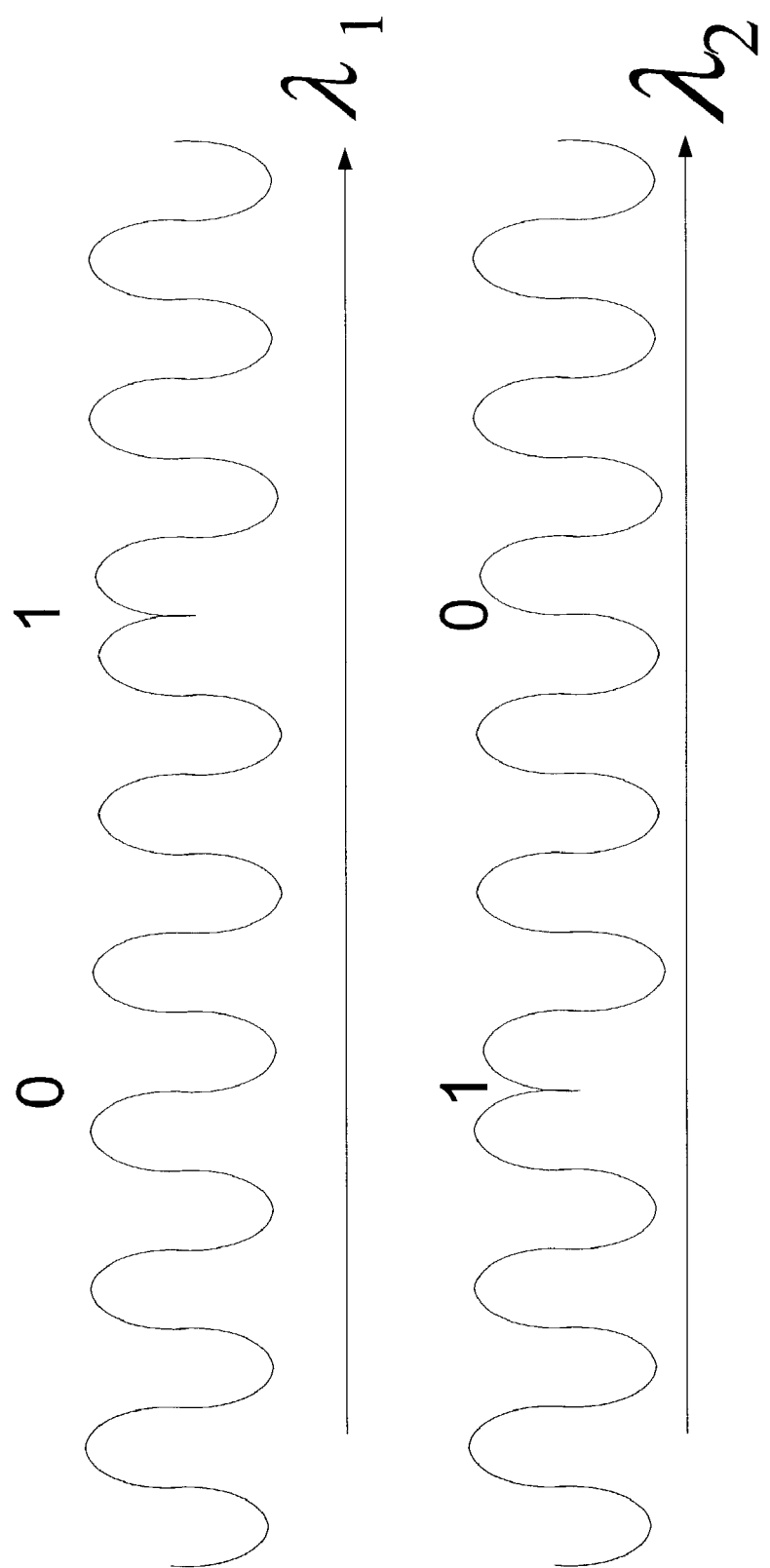
FIG. 10 illustrates using constant-envelope modulation on a channel.

The effect of the modulation is illustrated in FIG. 10 which depicts two channels, designated as λ1 and λ2 carrying data that has been encoded in a differential phase-shift keyed (DPSK) format. The optical field amplitude, shown in FIG. 10, shows the data as being encoded via an optical phase. For example, a zero is sent via continuous optical phase, and a one is sent via a 180 degree change in an optical phase. At the same time, the optical power envelope stays constant. Such an approach is effective for links that do not transform phase modulation into amplitude modulation after propagation. Such transformation would be the case with dispersive fiber links.

The above-described embodiments all include altering a transmission characteristic (e.g., delay, scrambling, inversion, modulation) of data on at least one channel of an optical communication network. As noted above, the data is typically highly correlated due to the fact that the signal includes a framing structure in a standard format (e.g., SONET). It is understood that any framing structure, whether an industry standard or independently developed, may create highly correlated channels. The alteration of the transmission characteristic reduces the correlation between channels, thereby reducing crosstalk.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of reducing crosstalk between optical channels in an optical communication network, the method comprising receiving first data on a first channel, the first data having a framing structure including at last one repetitive sequence of framing bytes;
    receiving second data on a second channel, the second data having a framing structure including at least one repetitive sequence of framing bytes coincident with the framing structure on the first channel;
    determining the length of a longest identical framing bytes in the first data;
    altering a transmission characteristic of the first data on the first channel to reduce coincidence between the first data framing structure on the first channel and the second data framing structure on the second channel; and
    transmitting the first data on the first channel and the second data on the second channel;
    where said altering the transmission characteristic includes introducing a predetermined delay between the initiation of transmission by an optical multiplexer of the first data framing structure on the first channel and the initiation of transmission by the optical multiplexer of the second data framing structure on the second channel no shorter in duration than the time necessary to transmit the longest repetitive sequence of identical framing bytes in the first data.

2. The method of claim 1 wherein the delay is no shorter than 308 ns.

3. The method of claim 1 wherein the delay is provided by an electronic delay device.

4. A method of reducing crosstalk between channels in an optical communication network, the method comprising receiving first data on a first channel, the first data having a framing structure including at last one repetitive sequence of framing bytes;
    receiving second data on a second channel, the second data having a framing structure including at least one repetitive sequence of framing bytes coincident with the framing structure on the first channel;
    altering a transmission characteristic of the first data on the first channel to reduce coincidence between the first data framing structure on the first channel and the second data framing structure on the second channel; and
    transmitting the first data on the first channel and the second data on the second channel;
    wherein the delay is no shorter than 154 ns.

5. A method of reducing crosstalk between channels in an optical communication network, the method comprising receiving first data on a first channel, the first data having a framing structure including at last one repetitive sequence of framing bytes;
    receiving second data on a second channel, the second data having a framing structure including at least one repetitive sequence of framing bytes coincident with the framing structure on the first channel;
    determining real time the framing structure of the received data on the first channel;
    in response to the framing structure determined, altering a transmission characteristic of the first data on the first channel to reduce coincidence between the first data framing structure on the first channel and the second data framing structure on the second channel; and
    transmitting the altered transmission characteristic first data on the first channel and the second data on the second channel;
    where the framing structure is a SONET, SDH, ESCON, or FiberChannel framing structure.

6. The method of claim 5, wherein where said altering the transmission characteristic includes introducing a predetermined delay between the initiation of transmission by an optical multiplexer of the first data framing structure on the first channel and the initiation of transmission by the optical multiplexer of the second data framing structure on the second channel no shorter in duration than the time necessary to transmit the longest repetitive sequence of identical framing bytes in the first data.

7. A method of reducing crosstalk between channels in an optical communication network, the method comprising receiving first data on a first channel, the first data having a framing structure including at last one repetitive sequence of framing bytes;
receiving second data on a second channel, the second data having a framing structure including at least one repetitive sequence of framing bytes coincident with the framing structure on the first channel;
altering a transmission characteristic of the first data on the first channel to reduce coincidence between the first data framing structure on the first channel and the second data framing structure on the second channel; and
transmitting the first data on the first channel and the second data on the second channel;
where said altering the transmission characteristic includes introducing a variable delay between the initiation of transmission by an optical multiplexer of the first data framing structure on the first channel and the initiation of transmission by the optical multiplexer of the second data framing structure on the second channel, and is actively controlled by a programmable electronic delay device comprising a delay controller.

8. The method of claim 7 wherein the programmable electronic delay device further comprises frame detectors that determine the times of initiation of the first and second framing structure.

9. The method of claim 8 wherein the frame detector detects a synchronization signal from a digital circuitry that forms the framing structure under the communication protocol.

10. The method of claim 8 wherein the frame detector detects a transition between two repetitive sequences of identical framing bytes, by detection of a bipolar pulse in a low-pass filtered framing structure signal.

11. The method of claim 7 wherein the delay controller utilizes the times of initiation of the first and second framing structure to calculate a minimal delay necessary to reduce crosstalk between channels in an optical communication network by prevention of the coincident transmissions of the framing structures by the optical multiplexer, and the introduced variable delay is set by the delay controller to at least the minimal delay calculated.

* * * * *